United States Patent

[11] 3,616,208

[72] Inventors John David Howells
Grosse Pointe Woods;
Albert Ryder, Detroit, both of Mich.
[21] Appl. No. 671,557
[22] Filed Sept. 29, 1967
[45] Patented Oct. 26, 1971
[73] Assignee Parke, Davis & Company
Detroit, Mich.
Continuation-in-part of application Ser. No. 606,044, Dec. 30, 1966, now abandoned.

[54] FERMENTATION PROCESS FOR 9-(β-D-ARABINOFURANOSYL)ADENINE
5 Claims, No Drawings
[52] U.S. Cl...................................................... 195/28 N, 195/80
[51] Int. Cl........................................................ C12d 13/06
[50] Field of Search............................................ 195/28 N, 80

[56] References Cited
UNITED STATES PATENTS
2,757,123  7/1956  Sobin et al..................... 195/80 X
3,094,460  6/1963  DeBoer et al................. 195/28 N

*Primary Examiner*—Alvin E. Tanenholtz
*Attorneys*—Robert R. Adams, David B. Ehrlinger, George M. Richards and Edward J. Gall ABSTRACT: Process for the production of 9-(β-D-arabinofuranosyl)adenine by inoculating an aqueous nutrient medium, preferably containing sources of assimilable carbon and nitrogen and added inorganic salt and having a pH between about 6 and 8, with a 9-(β-D-arabinofuranosyl)adenine-producing strain of *Streptomyces antibioticus*, such as the strain corresponding to NRRL 3238, conducting a fermentation under aseptic aerobic conditions at a temperature between about 20° and 45° C. until a substantial quantity of 9-(β-D-arabinofuranosyl)adenine is formed, and isolating the desired product from the fermentation mixture. The 9-(β-D-arabinofuranosyl)adenine product of the process is useful as an antiviral agent that is active in in vitro and in vivo against both herpes and vaccinia viruses.

FERMENTATION PROCESS FOR 9-(β-D-ARABINOFURANOSYL)ADENINE

This application is a continuation-in-part of copending application Ser. No. 606,044, filed Dec. 30, 1966, now abandoned.

SUMMARY AND DETAILED DESCRIPTION

The present invention relates to a process for the production of 9-(β-D-arabinofuranosyl)adenine, which is represented by the formula.

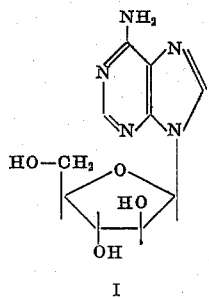

I

More particularly, the invention relates to a fermentation process for the production of the compound of the foregoing formula by cultivating a selected 9-(β-D-arabinofuranosyl)adenine-producing strain of the organism *Streptomyces antibioticus*.

In accordance with the invention, 9-(β-D-arabinofuranosyl)adenine is produced by cultivating a selected 9-(β-D-arabinofuranosyl)adenine-producing strain of the organism *Streptomyces antibioticus* under artificial conditions in a suitable nutrient medium until a substantial quantity of 9-(β-D-arabinofuranosyl)adenine is formed. Following the period of cultivation or incubation, 9-(β-D-arabinofuranosyl)adenine can be obtained from the medium by procedures described hereinafter and can be subjected to the degree of further purification desired. The term "9-(β-D-arabinofuranosyl)adenine-producing strain of the organism *Streptomyces antibioticus*," as used in the present specification and claims, means a strain of *Streptomyces antibioticus* which, when propagated under the artificial conditions herein described, causes the formation of a beer from which 9-(β-D-arabinofuranosyl)adenine can be obtained by the procedures set forth.

A strain of *Streptomyces antibioticus* suitable for the purpose of the invention has been isolated from a sample of soil collected near Bosco Trecase, Naples Province, Campania, Italy. Cultures of this organism have been deposited with the United States Department of Agriculture, Northern Utilization Research and Development Division, Peoria, Illinois, and are being maintained in their permanent culture collection as NRRL 3238.

The organism is an aerobic and aerially sporulating member of the order Actinomycetales and belongs in the genus *Streptomyces* as described in the Seventh Edition of Bergey's Manual of Determinative Bacteriology (1957). Its macroscopic cultural characteristics on numerous media useful for identification of members of this genus are shown in table 1.

When the organism is cultivated on certain agar media, the aerial mycelium is usually light to grayish yellowish brown. Cultivation in these agar media leads to the formation of yellowish brown to moderate brown soluble pigment that becomes reddish when the media are treated with sodium hydroxide. In media containing complex nitrogen sources a dark brown or black soluble pigment is formed.

The spore chains are straight to flexuous, occasionally looped or loosely spiralled With age, the chains become very flexuous and irregular. The spores are smooth and elliptical to globose nd may vary in size from 0.7–1.2 microns × 0.9–1.7 microns.

In carbon utilization tests, good to fair growth was obtained with the following single carbon sources: glucose, L-arabinose, D-xylose, i-inositol, D-mannitol, D-fructose, and rhamnose. Poor to fair growth was obtained with raffinose, and poor or no growth was obtained with sucrose and cellulose.

In micromorphology, color of aerial mycelium, and melanin production, the organism resembles *Streptomyces antibioticus*, and is therefore regarded as a member of this species. In comparative laboratory studies our organism is similar to the type culture of *S. antibioticus*, strain IMRU 3435. In certain respects, however, our organism is distinctly different from the IMRU 3435 strain, as shown in table 2, and is therefore regarded as a new and distinct strain of *S. antibioticus*, the new strain being represented by culture number NRRL 3238.

In accordance with the invention, 9-(β-D-arabino-furanosyl)adenine is produced by inoculating an aqueous nutrient medium with a 9-(β-D-arabinofuranosyl)adenine-producing strain of *Streptomyces antibioticus*, conducting a fermentation under aseptic aerobic conditions at a temperature between about 20° and 45° C. until a substantial quantity of 9-(β-D-arabinofuranosyl)adenine is formed in the fermentation mixture, and subjecting the fermentation mixture to subsequent treatment in order to obtain the desired product.

TABLE 1.—MACROSCOPIC CULTURAL CHARACTERISTICS OF 9-(β-D-ARABINOFURANOSYL) ADENINE-PRODUCING STRAIN OF *STREPTOMYCES ANTIBIOTICUS* CORRESPONDING TO NRRL 3238

| | Color of— | | | |
|---|---|---|---|---|
| Culture medium | Aerial mycelium | Reverse of substrate mycelium | Soluble pigment | Other features |
| Yeast extract-malt extract agar | Grayish yellowish brown. | Brownish gray | Moderate brown | Reddish with addition of NaOH.[1] |
| Oatmeal agar | do | Lt. to moderate olive brown. | Grayish to strong yellowish brown. | Do.[1] |
| Inorganic salts-starch agar | Lt. to grayish yellowish brown. | Lt. olive gray to moderate yellowish brown. | Lt. to moderate yellowish brown. | Do.[1] |
| Glycerol-asparagine agar | Grayish yellowish brown. | Grayish yellow | Grayish to strong yellowish brown. | Do.[1] |
| Starch agar B | Lt. to grayish yellow brown. | Lt. brownish gray to lt. grayish yellowish brown. | None | |
| Organic nitrate broth | | | | Nitrate not reduced to nitrite. |
| Gelatin | | | Dark brown | Strong liquefaction. |
| Milk | | | do | Strong hydrolysis. |
| Trypton-yeast extract broth | | | do | |
| Peptone-yeast extract-iron agar | | | Black | |
| Tyrosine agar | | | Dark brown | |
| Yeast extract-malt extract agar | | | | 28° C.—good growth; 37° C.—good growth; 45° C.—good growth; 50° C.—good growth. |

[1] Color of soluble pigment.
NOTE.—Lt.=light.

TABLE 2.—COMPARISON OF 9-(β-D-ARABINOFURANOSYL)ADENINE-PRODUCING STRAIN OF *STREPTOMYCES ANTIBIOTICUS* CORRESPONDING TO NRRL 3238 WITH *S. ANTIBIOTICUS* CORRESPONDING TO IMRU 3435

| Characteristic | *S. antibioticus*, corresponding to NRRL 3238 | *S. antibioticus*, corresponding to IMRU 3435 |
|---|---|---|
| Color of aerial mycelium [1] | Light to grayish yellowish brown | Medium gray to light brownish gray. |
| Micromorphology of aerial mycelium [1] | Occasional loops and spirals | No loops or spirals observed. |
| Soluble pigment: | | |
|   Yeast extract-malt extract agar | Moderate brown | Grayish yellow. |
|   Oatmeal agar | Grayish to strong yellowish brown | Do. |
|   Inorganic salts-starch agar | Light to moderate yellowish brown | None. |
|   Glycerol-asparagine agar | Grayish to strong yellowish brown | Do. |
|   Effect of NaOH on soluble pigment of above media | Pigment becomes reddish | Pigment unchanged. |
|   Tyrosine agar | Dark brown | None. |
| Carbon utilization: | | |
|   Sucrose | Poor | Do. |
|   Xylose | Good | Fair. |
|   i-Inositol | Fair | Good. |
|   L-rhamnose | do | Do. |
|   Raffinose | Poor to fair | None. |
| Nitrate reduction to nitrite | Negative | Positive. |
| Gelatin liquefaction | Strong | Weak. |
| Milk hydrolysis | do | Do. |
| Growth on yeast extract-malt extract agar at 45° C. and at 50° C | Positive | Negative. |

[1] Table 1, in first five media.

For the inoculation, spores or conidia of the selected culture of *Streptomyces antibioticus* can be used. Aqueous suspensions of the spores or conidia containing a small amount of soap or another wetting agent can be conveniently employed. For large fermentations it is preferable to use vigorous young aerated and agitated broth cultures of the microorganism.

Suitable aqueous nutrient media are those containing assimilable sources of carbon and nitrogen and preferably having a pH between about 6 and 8. Sources of carbon which are assimilable and satisfactory for use include pure carbohydrates that can be utilized by the organism as well as commercially available carbohydrate mixtures. Some examples of the materials that are suitable for this purpose are various sugars, such as glucose, maltose, lactose, and mannose; starch and modified starches; corn syrup; malt liquors; blackstrap molasses; glycerol; and corn meal. The quantity of the carbohydrate present in the nutrient medium is not particularly critical and can vary from about 0.5 to 5 percent by weight of the medium. Quantities somewhat outside of this range can also be used.

The sources of nitrogen in the nutrient medium can be of an organic, inorganic, or mixed organic-inorganic nature. Some examples of the many nitrogenous substances that can be employed in the nutrient medium are amino acids, peptones, hydrolyzed and unhydrolyzed proteins, fish meal, soybean meal, peanut meal, cottonseed meal, wheat gluten, corn steep liquor, dehydrated corn steep liquor, meat extracts, inorganic nitrates, urea, and ammonium salts. Because of the crude nature of most of the readily available nitrogen sources, the quantity to be added to the medium varies according to the purity, and it is not readily possible to specify a definite quantity of nitrogenous source material that should be added to the medium. It can be said, however, that, for practical purposes, nitrogenous materials need not exceed 6 percent by weight of the total fermentation medium nd can be present in a considerably lower amount.

The presence of a certain amount of mineral salts and traces of growth factors of unknown composition is desirable in order to obtain the best yields of 9-(β-D-arabinofuranosyl)adenine. Many readily available crude materials, such as corn steep liquor, yeast preparations, soybean oil meal, molasses fermentation residues, and other products of like character contain such inorganic salts and growth factors, and the inclusion of one or more of these materials in the fermentation medium is desirable. In order to ensure the presence of adequate amounts of the mineral components of the medium, it is also advantageous in many cases to add some inorganic salts, such as sodium chloride, sodium bicarbonate, potassium phosphate, sodium acetate, calcium carbonate, and magnesium sulfate, as well as trace quantities of minerals such as copper, cobalt, manganese, zinc, and iron. The preferred concentration of a given mineral salt is between 0.1 and 1 percent by weight of the nutrient medium.

The cultivation of the selected strain of *Streptomyces antibioticus* in the aqueous nutrient medium can be carried out in a number of different ways. For example, the organism can be cultivated under aerobic conditions on the surface of the medium; or it can be cultivated beneath the surface of the medium, that is, in the submerged condition, provided that an adequate supply of oxygen is furnished.

The preferred method for producing 9-(β-D-arabino-furanosyl)adenine on a large scale is by the fermentation of a 9-(β-D-arabinofuranosyl)adenine-producing strain of *Streptomyces antibioticus* in a submerged or deep culture. According to this embodiment of the invention, a sterile aqueous nutrient medium is inoculated with the selected culture and incubated with agitation and aeration under aseptic conditions at a temperature between about 20° and 45° C., preferably in the neighborhood of 33°–40° C., until a substantial quantity of 9-(β-D-arabinofuranosyl)adenine is found in the culture liquid. The length of time required for the maximum yield varies with the size and type of equipment used, the rates of agitation and aeration, the specific organism culture and other factors. In large scale commercial fermentations carried out in the tank-type fermentors, maximum production is usually reached in about 3 to 7 days. Shorter fermentation periods can also be used, but usually produce a lower yield. When the fermentation is carried out in shaken flasks, the time required for maximum production may be somewhat longer than when large fermentation tanks are used.

Under the submerged culture conditions, the microorganism develops as relatively discrete particles dispersed throughout the nutrient medium in contrast to the relatively continuous pellicle present on the surface of the medium in the surface culture method. By virtue of this distribution of the organism throughout the medium, large volumes of the inoculated nutrient medium can be used in the cultivation of the organism in the tanks and vats customarily employed in the fermentation industry. Stationary vat fermentors equipped with agitation and aeration devices are particularly suitable for large-scale production, although fermentation equipment for other designs can also be used. For the production of smaller quantities of product or for the preparation of cultures of the organism to be used as inoculum for large-scale fermentations, the submerged culture method can be carried out in small flasks or jars which are either shaken or stirred by suitable mechanical means.

In the submerged culture method, agitation and aeration of the culture mixture can be accomplished in a number of ways. Agitation can be provided by turbines, paddles, impellers or other mechanical agitation devices, by revolving or shaking the fermentor itself, by various pumping devices or by the passage of air or oxygen through the medium. Aeration can be brought about by injecting air or oxygen into the fermentation mixture through open pipes, perforated pipes, or pipes containing a porous diffusion section; or it can be brought about by spraying, splashing or spilling the medium into or through an oxygen-containing atmosphere.

An alternative to the preferred submerged culture method is the surface culture method of producing 9-($\beta$-D-arabinofuranosyl)adenine according to which a shallow layer, usually less than 2 cm., of a sterile, aqueous nutrient medium is inoculated with a 9-($\beta$-D-arabinofuranosyl)adenine-producing strain of *Streptomyces antibioticus* and the inoculated mixture is incubated under aerobic conditions at a temperature between about 20° and 45° C. The product is then obtained in a manner similar to that described for the submerged culture method.

Upon completion of the fermentation phase of the process, the desired product can be obtained in a number of ways. In the case of the submerged culture method, the preferred method is as follows. The mycelium is separated by such means as filtration or centrifugation. The filter cake is washed well with water, the washings are combined with the filtered beer, and the combined liquids are concentrated under reduced pressure to about one-twelfth the original volume. The concentrated solution is cooled at about 5° C. for an extended period (from several hours to several days, depending on the volume), and the solid that precipitates is isolated by filtration with the aid of diatomaceous earth. The filter cake is then extracted well with boiling water, and the combined extracts are cooled at about 5° C. until precipitation is complete. The crystalline 9-($\beta$-D-arabinofuranosyl)adenine that precipitates is isolated by filtration and further purified by successive crystallizations from boiling water.

Alternatively, the desired product can be obtained from the submerged culture method by employing adsorption techniques as follows. Again, after fermentation is complete, the mycelium is separated by such means as filtration or centrifugation. The crude product is then adsorbed by treating the filtered beer with activated charcoal, or other adsorbing agent. The adsorption can be carried out either in batches or by continuous flow through an adsorption column. In the preferred batch method, from 0.1 to 0.6 percent, preferably 0.35 to 0.4 percent, weight/volume, of the preferred charcoal adsorbent is added to the filtered beer, and the resulting mixture is stirred for 1–3 hours. In some cases, it may be desirable to remove impurities from the filtered beer prior to charcoal treatment either by extracting it with an immiscible organic solvent, such as ethylene dichloride or ethyl acetate, or by treating it with a synthetic cation exchange resin in the sodium form. The crude product is isolated by eluting the charcoal adsorbent with aqueous acetone or with an aqueous lower alkanol and evaporating the eluate under reduced pressure. The solid residue obtained is then purified either by successive crystallizations from water or a lower alkanol or by the following procedure. The solid residue is extracted with a water-immiscible liquid alkanol, such as n-butyl alcohol, and the extract is poured onto a column of alumina (pH 5–6). The alumina column is eluted with 95 percent aqueous ethanol, the eluate is evaporated, and the solid obtained is crystallized from water or a lower alkanol to give the desired 9-($\beta$-D-arabinofuranosyl)adenine.

The product of the process of the invention, 9-($\beta$-D-arabinofuranosyl)adenine, is useful as an antiviral agent that is active in vitro and in vivo against both herpes and vaccinia viruses.

The invention is illustrated by the following examples.

EXAMPLE 1

Sterile agar slants are prepared using the *Streptomyces* sporulation medium of Hickey and Tresner [R. J. Hickey and H. D. Tresner, J. Bact., Vol. 64, pages 891–892 (1952)]. Four of these slants are inoculated with lyophilized spores of *Streptomyces antibioticus* corresponding to NRRL 3238, incubated at 28° C. for 7 days or until aerial spore growth is well advanced, and then stored at 5° C. The spores from the four slants are suspended in 40 ml. of 0.1 percent sterile sodium heptadecyl sulfate solution.

A nutrient medium having the following composition is prepared:

| | |
|---|---|
| Glucose monohydrate | 2.0% |
| Soybean meal, solvent extracted, 44% protein | 1.0% |
| Animal peptone (Wilson's Protopeptone 159) | 0.5% |
| Ammonium chloride | 0.2% |
| Sodium chloride | 0.5% |
| Calcium carbonate | 0.25% |
| Water to make 100% | |

The pH of the medium is adjusted with 10-normal sodium hydroxide solution to pH 7.5.

12 liters of this medium is placed in a 30-liter stainless steel fermentor. The medium is sterilized by heating it at 121° C. for 90 minutes, allowed to cool, inoculated with the 40-ml. spore suspension described above, and incubated at 25°–27° C. for 32 hours while being agitated at 200 r.p.m. with air being supplied at the rate of 12 liters per minute. About 38 g. of a mixture of lard and mineral oils containing mono- and diglycerides is added in portions during this time to prevent excessive foaming.

Sixteen liters of a nutrient medium having the composition described above is placed in each of four 30-liter stainless steel fermentors. The pH of the medium in each fermentor is adjusted with 10-normal sodium hydroxide solution to pH 7.5, and each is sterilized by heating at 121° C. for 90 minutes. Upon cooling, the medium in each fermentor is inoculated with 800 ml. of the fermentation mixture described above, and each is incubated at 25°–27° C. for 96 hours while being agitated at 200 r.p.m. with air being supplied at the rate of 16 liters/minute. About 170 g. of the antifoam mixture described above is added in portions during this time to the medium in each fermentor.

The fermentation mixtures from the four fermentors are combined and filtered with the aid of diatomaceous earth. A material such as Celite 545 can be used. The filtrate is concentrated under reduced pressure to a volume of 10 liters, and the concentrate is treated with 200 g. of activated charcoal (for example, Darco G–60), stirred at room temperature for one hour, and filtered. The charcoal cake is washed with 7.5 liters of water, and then extracted with three e10-liter portions of 50 percent aqueous acetone. The three aqueous acetone extracts are combined, concentrated under reduced pressure to approximately one liter, and chilled at 5° C. for 48 hours. The solid 9-($\beta$-D-arabinofuranosyl)adenine that precipitates is isolated and purified by successive crystallizations from boiling methanol and from boiling water; m.p. 262°–263° C.

In the foregoing procedure, when the temperature of incubation in the two fermentation stages is raised from 25°–27° C. to 36°–38° C., the same 9-($\beta$-D-arabinofuranosyl)adenine product is obtained in higher yields.

EXAMPLE 2

A nutrient medium having the following composition is prepared:

| | |
|---|---|
| Glucose monohydrate | 2.0 % |
| Soybean meal, solvent extracted, 44% protein | 1.0% |
| Animal peptone (Wilson's Protopeptone 159) | 0.5% |
| Ammonium chloride | 0.2% |
| Sodium chloride | 0.5% |
| Calcium carbonate | 0.25% |
| Water to make 100% | |

The pH of the medium is adjusted with 10-normal sodium hydroxide solution to pH 7.5.

10 gallons of this medium is placed in a 30-gallon stainless steel fermentor. The medium is sterilized by heating it at 121° C. for 60 minutes, allowed to cool, and inoculated with a 40-ml. spore suspension prepared as described in the first paragraph of example 1 above. An antifoam mixture (150 ml.) consisting of lard and mineral oils containing mono- and diglycerides (for example, Swift's No. 51 Inedible Defoamer) is added and the mixture is incubated at 26°–27° C. for 59 hours with aeration at a rate of 6.25 cubic feet per minute.

Three hundred gallons of a nutrient medium having the composition described above is placed in a 500-gallon Inconel-clad fermentor. The medium is adjusted to pH 7.5 with 10-normal aqueous sodium hydroxide and then sterilized by heating it at 121° C. for 30 minutes. Upon cooling, the medium is inoculated with 10 gallons of the fermentation mixture described above, about 1,000 ml. of the antifoam mixture described above is added, and the mixture is incubated at 24°–25.5° C. for 24 hours with agitation at 84 r.p.m. and aeration at a rate of 45 cubic feet per minute. During this period an additional 513 ml. of antifoam is added in portions.

1,200 gallons of a nutrient medium having the same composition described above is placed in each of two 2,000-gallon Inconel-clad fermentors. The medium in each fermentor is adjusted to pH 7.5 with 10-normal aqueous sodium hydroxide and sterilized by heating at 121° C. for 30 minutes. Upon cooling, each is inoculated with 150 gallons of the fermentation mixture described in the preceding paragraph, 10 liters of antifoam is added to each, and each is incubated at 24.5°–26.5° C. for 95 hours with agitation at 125 r.p.m. and aeration at a rate of 120 cubic feet per minute. During this period an additional 40–46 liters of antifoam is added on demand.

The fermentation mixtures from the two fermentors are combined, adjusted to pH 7.2 with 10-normal aqueous sodium hydroxide, slurried with 300 pounds of diatomaceous earth, and filtered. The filtrate is concentrated under reduced pressure to a volume of 500 gallons, and the concentrate is treated with 87 pounds of activated charcoal, stirred at room temperature for one hour and filtered. The charcoal cake is washed with 400 gallons of water, and then extracted with three 500-gallon portions of 50 percent aqueous acetone. The three aqueous acetone extracts are combined, concentrated under reduced pressure to a volume of 45 gallons, and chilled at 5° C. for 48 hours. The solid 9-($\beta$-D-arabinofuranosyl)adenine that precipitates is isolated and crystallized successively from methanol and from water; m.p. 262°–263° C.

In the foregoing procedure, improved yields of the 9-($\beta$-D-arabinofuranosyl)adenine product are obtained when the incubation temperature is raised in the first fermentation stage from 26°–27° C. to 29°–30° C., in the second fermentation stage from 24°–25.5° C. to 29°–30° C., and in the final fermentation stage from 24.5°–26.5° C. to 36°–38° C.

EXAMPLE 3

A nutrient medium having the following composition is prepared:

| | |
|---|---|
| Glucose monohydrate | 2.0% |
| Soybean meal, solvent extracted, 44% protein | 1.0% |
| Animal peptone (Wilson's Protopeptone 159) | 0.5% |
| Ammonium chloride | 0.2% |
| Sodium chloride | 0.5% |
| Calcium carbonate | 0.25% |
| Water to make 100% | |

The pH of the medium is adjusted with 10-normal sodium hydroxide solution to pH 7.5.

12 liters of this medium is placed in a 30-liter stainless steel fermentor. The medium is sterilized by heating it at 121° C. for 90 minutes, it is allowed to cool, and is inoculated with a 40-ml. spore suspension prepared as described in the first paragraph of example 1 above. The inoculated medium is then incubated at 29°–30° C. For 36 hours while being agitated at 200 r.p.m. with aeration being supplied at the rate of 12 liters per minute. About 44 g. of mixture of lard and mineral oils containing mono- and diglycerides is added in portions during this time to prevent excessive foaming.

A nutrient medium having the following composition is next prepared:

| | |
|---|---|
| Glucose monohydrate | 2.0% |
| Soybean meal, solvent extracted, 44% protein | 2.0% |
| Sodium chloride | 0.5% |
| Calcium carbonate | 0.25% |
| Water to make 100% | |

The pH of the medium is adjusted with 10-normal sodium hydroxide solution to pH 7.5.

10 gallons of his second medium is placed in a 30-gallon stainless steel fermentor. The medium is sterilized by heating it at 121° C. for 60 minutes, it is allowed to cool, and is inoculated with about 400 ml. of the fermentation mixture described above. An antifoam mixture (150 ml.) consisting of lard and mineral oils containing mono- and diglycerides (for example, Swift's No. 51 Inedible Defoamer) is added, and the mixture is incubated at 29°–30° C. for 24 hours with aeration at a rate of 6.3 cubic feet per minute.

300 gallons of nutrient medium having the same composition as the 10-gallon seed medium described above is placed in 500-gallon Inconel-clad fermentor. The medium is adjusted to pH 7.5 with 10-normal aqueous sodium hydroxide and then sterilized by heating it at 121° C. for 30 minutes. Upon cooling, the medium is inoculated with 10 gallons of the fermentation mixture described immediately above, about 1,000 ml. of the antifoam mixture described above is added, and the mixture is incubated at 30°–31° C. for 24 hours with agitation at 84 r.p.m. and aeration at a rate of 45 cubic feet per minute. During this period, an additional 4,000 ml. of antifoam is added in portions.

1,200 gallons of a nutrient medium having the same composition as the 10-gallon and 300-gallon media described above is placed in each of two 2,000-gallon Inconel-clad fermentors. The medium in each fermentor is adjusted to pH 7.5 with 10-normal aqueous sodium hydroxide and sterilized by heating at 121° C. for 30 minutes. Upon cooling, each is inoculated with 150 gallons of the fermentation mixture described in the preceding paragraph, 10 liters of antifoam is added to each, and each is incubated at 36.5°–38° C. for 144 hours with agitation at 125 r.p.m. and aeration at a rate of 120 cubic feet per minute. During this period, an additional 140–196 liters of antifoam are added on demand.

The fermentation mixtures from the two fermentors are combined, filtered through a plate and frame press with the aid of diatomaceous earth, and the filter cake is washed with 100 gallons of water. The filtrate and wash water are combined, the combined liquids are concentrated under reduced pressure to about one-twelfth the original volume, and the concentrated solution is cooled at 5° C. for 72 hours. The solid that precipitates from the cooled solution is isolated by filtration with the aid of diatomaceous earth, the filter cake is extracted twice with boiling water, first with 28 gallons and then with 40 gallons, and the combined aqueous extracts are cooled at 5° C. for 2 hours. The crystalline 9-($\beta$-D-arabinofuranosyl)adenine that precipitates from the cooled solution is isolated by filtration and purified by crystallization twice from boiling water, the first crystallization from 28 gallons and the second from 20 gallons of water; m.p. 262°–263° C.

We claim:

1. Process for the production of 9-($\beta$-D-arabinofuranosyl)adenine which comprises inoculating an aqueous nutrient medium with a 9-($\beta$-D-arabinofuranosyl)adenine-producing strain of Streptomyces antibioticus, incubating the inoculated medium at a temperature between about 20 and 45° C. under aerobic conditions, and isolating the 9-($\beta$-D-arabinofuranosyl)adenine product.

2. Process according to claim 1 wherein the aqueous nutrient medium as a pH between 6 and 8.

3. Process according to claim 1 wherein the aqueous nutrient medium contains sources of assimilable carbon and nitrogen and added inorganic salt.

4. Process according to claim 1 wherein the inoculated medium is incubated at a temperature between 33° and 40° C.

5. Process according to claim 1 wherein the inoculated medium is incubated under submerged culture conditions.

UNITED STATES PATENT OFFICE
CERTIFICATE OF CORRECTION

Patent No. 3,616,208  Dated  October 26, 1971

Inventor(s) John David Howells et al.

It is certified that error appears in the above-identified patent and that said Letters Patent are hereby corrected as shown below:

Column 8, line 61, amend "2" to read -- 72 --; last line, amend "as" to read -- has --.

Signed and sealed this 2nd day of May 1972.

(SEAL)
Attest:

EDWARD M. FLETCHER, JR.  ROBERT GOTTSCHALK
Attesting Officer  Commissioner of Patents